United States Patent [19]

Ukaji et al.

[11] 3,872,210

[45] Mar. 18, 1975

[54] PROCESS FOR RECOVERING ANTIMONY VALUE OUT OF SPENT CATALYST

[75] Inventors: Rokuo Ukaji; Toshio Shiomi, both of Osaka, Japan

[73] Assignee: Daikin Kogyo Co., Ltd., Osaka, Japan

[22] Filed: Aug. 7, 1972

[21] Appl. No.: 278,201

[30] Foreign Application Priority Data

| Aug. 11, 1971 | Japan | 46-61153 |
| Aug. 13, 1971 | Japan | 46-61756 |
| Aug. 14, 1971 | Japan | 46-61910 |

[52] U.S. Cl. ................ 423/87, 423/561, 423/617
[51] Int. Cl. ..................... C01b 29/00, C22b 31/00
[58] Field of Search ...... 423/87, 617, 561; 75/97 R, 75/97 A, 121

[56] References Cited
UNITED STATES PATENTS

| 890,432 | 6/1908 | Masson | 75/121 |
| 935,337 | 9/1909 | Thwaites | 75/121 |
| 2,350,638 | 6/1944 | Podschus et al. | 423/617 |
| 2,605,211 | 7/1952 | Deters | 423/87 |

Primary Examiner—O. R. Vertiz
Assistant Examiner—Wayne A. Langel
Attorney, Agent, or Firm—Clelle W. Upchurch

[57] ABSTRACT

Spent antimony halide catalyst used in the production of chlorofluoroalkane by the fluorination of chloroalkane is treated with water or mineral acid, and the organic layer is separated out of the aqueous layer which contains antimony value. The aqueous layer is treated with a metal such as iron, manganese, copper, zinc, tin, or their salts, or alternatively treated with hydrogen sulfide, sodium sulfide or ammonium sulfide, to precipitate antimony compounds.

8 Claims, No Drawings

3,872,210

PROCESS FOR RECOVERING ANTIMONY VALUE OUT OF SPENT CATALYST

BACKGROUND OF THE INVENTION

The present invention relates to a novel process for the recovery of spent antimony halide catalyst, and more particularly to a process for recovering antimony value out of spent antimony halide catalyst used in the production of chlorofluoroalkane by the fluorination of chloroalkane.

In general, antimony catalyst is used as a catalyst in the production of chlorofluoroalkanes such as trichlorofluoromethane, dichlorodifluoromethane, chlorodifluoromethane, tetrachlorodifluoroethane, trichlorotrifluoroethane and dichlorotetrafluoroethylene by the fluorination of chloroalkanes such as carbon tetrachloride, chloroform and tetrachloroethylene, as described in U.S. Pat. Nos. 2,005,705, 2,005,709 and 2,005,710. In the production of chlorofluoroalkane, the catalyst activity is gradually reduced and the deactivated catalyst (hereinafter referred to as spent antimony catalyst) has been usually disused. In such a spent antimony catalyst used in the fluorination of chloroalkane includes antimony trifluoride, antimony chlorofluoride, antimony trioxide, antimony pentoxide, a small amount of metal chloride, silicon dioxide and organic compounds.

It is desirable to recover antimony value out of spent antimony catalyst since antomony is comparatively expensive heavy metal. In practice, the recovery of spent antimony catalyst has not been carried out since the above-mentioned organic compounds are strongly adhered into the spent antimony catalyst and accordingly the recovery of antimony value is extremely difficult.

OBJECTS OF THE INVENTION

It is an object of the present invention to provide a process for recovering antimony value effectively and readily out of spent antimony catalyst.

Another object of the invention is to provide a process for recovering 100 % of antimony value out of spent antimony catalyst.

Further object of the invention is to provide a process for reducing, into less than 1 p.p.m., antimony ion in waste water exhausted out of the plant for recovering antimony value from the spent antimony catalyst.

These and other objects of the invention will be apparent from the description hereinafter.

DESCRIPTION OF THE INVENTION

It has now been found that the objects of the invention can be accomplished by treating the spent antimony catalyst with water or mineral acid to separate organic compounds which are included into the spent antimony catalyst as an under layer. And the resultant aqueous layer is treated with metals such as iron, manganese, copper, zinc and tin or their salts (in case of adding iron, antimony compound is simultaneously reduced and a part of the reduced antimony compound becomes insoluble to give precipitate) and then neutralized to precipitate antimony value completely, or alternatively the above aqueous layer is treated with sulfides such as hydrogen sulfide, sodium sulfide and ammonium sulfide under an acidic condition to precipitate all the antimony value in the layer.

In the present invention, the spent antimony catalyst is treated with water or mineral acid, and accordingly soluble antimony compounds such as antimony pentachloride, antimony trifluoride, antimony chlorofluoride, and the other metal chlorides in the spent antimony catalyst are dissolved into an aqueous layer and simultaneously insoluble antimony compounds such as antimony trioxide and antimony pentoxide are dispersed, in a colloidal form, in the aqueous layer. Further, organic compounds are separated as an under layer. The spent antimony catalyst is substantially transferred into an aqueous layer. Organic under layer can be readily separated out by the decantation or other appropriate means.

The process of the present invention is generally carried out by mixing the spent antimony catalyst and water or mineral acid with agitation and then allowing to stand the mixture. The amount used of water is preferably about 0.4 to 2.5 parts by weight to 1 part by weight of spent antimony catalyst. The use of water is preferable in case the ratio of soluble antimony compounds is high in the spent antimony catalyst.

On the other hand, the use of mineral acid is preferable in case the ratio of insoluble antimony compounds is high. Examples of the mineral acid are hydrochloric acid, sulfuric acid, nitric acid, and the like. The concentration of mineral acid used varies according to a composition of spent antimony catalyst treated. In case of hydrochloric acid it is preferably 12 N or below; and in case of sulfuric acid or nitric acid it is preferably lower concentration because of their strong decomposing ability against organic compounds. The amount or the concentration of mineral acid should be determined according to the composition of spent antimony catalyst.

The treatment with water or mineral acid can be carried out under heating to accelerate the hydrolysis of spent antimony catalyst.

Thus, the mixture is separated into an aqueous upper layer and an organic under layer (under certain circumstances, an extremely small amount of organic layer is formed on the aqueous layer, but in such a case the organic layer may be removed off by an appropriate means such as decantation). These upper layer and under layer are separated by decantation or other appropriate means. To the residual aqueous layer are treated with a metal such as iron, manganese, copper, zinc or tin, or salts thereof. Suitable metal salts are its chloride, sulfate, nitrate, and the like. These metals and their salts may be added as a solid form or an aqueous solution. The aqueous layer treated with metals or their salts is neutralized with alkaline materials such as sodium hydroxide, potassium hydroxide, and the like, preferably until a pH value of about 7 to 10. As a result, almost all the antimony value is converted to insoluble antimony compounds, and co-precipitated with these metals or their salts together with the dispersed insoluble antimony compounds and further a few residual antimony value is adsorbed into the above co-precipitates. After all, the antimony compounds are thoroughly recovered (up to below about 1 p.p.m.).

Alternatively, the above-mentioned residual aqueous layer may be treated with sulfide such as hydrogen sulfide, sodium sulfide or ammonium sulfide under an acidic condition to precipitate antimony compounds. An appropriate acidity is about 0.001 N to 4 N, preferably about 0.1 N to 1 N as a concentration of hydrochloric acid. It is desirable that the acidity of aqueous layer is previously adjusted into the above range prior to the treatment with the sulfide. In case the sulfide is gas, the treatment may be carried out by bubbling means. In case of solid, it may be carried out by adding the solid per se or aqueous solution thereof and, if necessary, agitating the mixture. The amount used of the sulfides is preferably about 5 times of theoretical value as pure sulfide to antimony value in the aqueous layer.

The treatment may be carried out at normal temperature. In case of including fluorine ion, however, it can be preferably carried out with heating since the sulfide is readily precipitated out of the aqueous layer. An appropriate temperature is about 30° to 80°C. In the aqueous layer thus treated, the antimony value is recovered as a solid sulfide. The antimony concentration in the filtrate can be reduced into less than 1 p.p.m. as pure antimony by filtration.

According to the present invention, as described above, the aqueous layer after separating out the organic layer is treated with the metal, metal salt or sulfide. However, in case the aqueous medium includes much antimony value, much metal, metal salt or sulfide is also required. In such a case, it is preferable that some amounts, as much as possible, of antimony value are taken out of the aqueous layer, and the residual antimony value is precipitated by the above-mentioned treatment since the complete precipitation can be proceeded by a relatively small amount of metal, metal salt or sulfide, which is included within the scope of the present invention.

The means for previously taking out some amounts of antimony value out of the aqueous layer is, for instance, hydrolysis or neutralization of the aqueous layer. Hydrolysis is carried out by controlling the acidity of aqueous layer, whereby water-soluble antimony compounds are converted into water-insoluble compounds. The acidity suitable for hydrolysis is below about 3 N as an acidity of hydrochloric acid, or the corresponding acidity thereto. Neutralization is carried out by neutralizing the aqueous layer with an alkali, whereby water-soluble antimony compounds are converted into water-insoluble compounds. Both procedures may optionally be combined.

The invention will now be described with reference to the following Examples wherein parts and percentage are by weight unless otherwise specified.

EXAMPLE 1

To 100 g. of spent antimony catalyst [consisting of 51.8 % of insoluble antimony compounds as antimony pentoxide, 18.4 % of soluble antimony value (whole antimony value: 56.8 %), 19.4 % of chlorine, 4.2 % of fluorine and 7 % of organic compounds including hydrocarbons as a main ingredient] was added 300 g. of 5 N hydrogen chloride solution, and the mixture was agitated at a normal temperature for 10 hours. The organic compounds were separated as an under layer and the insoluble antimony compounds were suspended as a colloidal form into the aqueous layer. The organic layer formed was separated by means of a separatory funnel. In the separated materials, there were included 7 g. of organic compounds and 2 g. of antimony compounds, and the recovery of organic compounds was 100 %. Thereafter, antimony oxide not including organic compounds was recovered out of the resultant aqueous layer, which was colorless and useful for a fire retardant.

EXAMPLE 2

To 100 g. of spent antimony catalyst [consisting of 7 % of insoluble antimony compounds as antimony pentoxide, 40.3 % of soluble antimony value (whole antimony value: 45.5 %), 35.2 % of chlorine, 12.5 % of fluorine and 5 % of organic compounds] was added 100 g. of water, and the mixture was agitated at a normal temperature for one hour, and thereafter was treated according to the same manner as in Example 1 to recover organic compounds. The recovery of organic compounds was 100 %. Thereafter, antimony oxide obtained out of the resultant aqueous layer was useful for a fire retardant.

EXAMPLE 3

To 100 g. of aqueous layer obtained in Example 1 was added 15 g. of powdery iron at a room temperature for 24 hours to reduce antimony compounds, and simultaneously a part of antimony compounds was precipitated. The greater parts of the antimony compounds in the aqueous layer were co-precipitated with ferrous hydroxide produced by neutralizing with a 20 % aqueous solution of sodium hydroxide. The resultant was allowed to stand for about 5 hours to adsorb the residual antimony value in the layer onto the above ferrous hydroxide, and then precipitates were filtered. As a result, the antimony value was completely recovered, and the obtained filtrate had an antimony concentration of only 1 p.p.m.

COMPARATIVE EXAMPLE 1

To 100 g. of the aqueous layer [consisting of 3.1 % of antimony trichloride (1.7 % as antimony), 38.1 % of antimony pentachloride (15.5 % as antimony), 2 % of fluorine, 22 % of chlorine and the others being water] obtained by the same manner as in Example 1 was added 900 g. of water at a room temperature to occur hydrolysis of antimony compounds for 5 hours. In the course of reaction, the acidity of the reaction system was maintained at about 0.15 to 2 N of hydrochloric acid. The resultant aqueous layer was filtered to recover antimony value of 80.1 %. The concentration of metal antimony was 67 % in the recovered materials and 3,600 p.p.m. in the filtrate.

EXAMPLE 4

To 100 g. of the filtrate (antimony concentration: 3,600 p.p.m., corresponding to 1 N hydrochloric acid) obtained in Comparative Example 1 were added 4 g. of powdery iron and 20 g. of a 35 % hydrochloric acid, whereby antimony compounds were reduced at a room temperature for 24 hours to precipitate a part of antimony compounds (antimony concentration in the filtrate: 75 p.p.m.). The resultant was neutralized into pH 8.5 by adding 55 g. of a 20 % aqueous solution of sodium hydroxide. By the produced ferrous hydroxide, a greater part of antimony compounds in the aqueous layer was co-precipitated. After allowing to stand for 5 hours, the precipitates were filtered. Antimony concentration in the filtrate was 0.6 p.p.m.

COMPARATIVE EXAMPLE 2

One hundred grammes of the aqueous medium [consisting of 21.1 % of antimony trichloride (11.7 % as antimony), 30 % of antimony pentachloride (12.2 % as antimony), 3.04 % of fluorine, 26 % of chlorine and the others being water] obtained by the same manner as in Example 1 was neutralized into pH 8.5 with a 20 % aqueous solution of sodium hydroxide. The resultant was allowed to stand for 12 hours and then filtered to recover the precipitated antimony (recovering ratio: 99.85 %). The concentration of metal antimony in the neutralized materials was 53 % and that in the filtrate was 190 p.p.m.

EXAMPLE 5

To 100 g. of the filtrate (antimony concentration: 190 p.p.m.) obtained in Comparative Example 2 were added 1 g. of ferrous chloride and then 0.4 g. of a 35 % hydrochloric acid to result in a clear solution. Immediately, 5 g. of a 20 % aqueous solution of sodium hydroxide was added to neutralize and co-precipitate antimony compounds (pH 8.9, antimony concentration in the filtrate: 54 p.p.m.), and the resultant was allowed to stand at a room temperature for 24 hours. The precipitate was filtered to give a filtrate in which antimony concentration was 0.4 p.p.m.

EXAMPLE 6

To 100 g. of the filtrate (antimony concentration: 190 p.p.m.) obtained in comparative Example 2 were added 0.5 g. of a 35 % hydrochloric acid and 1 g. of manganous chloride to result in a clear solution. Immediately, to the solution was added 5 g. of a 20 % aqueous solution of sodium hydroxide to neutralize until pH 9, whereby antimony compounds were co-precipitated. After neutralization, the resultant was allowed to stand for 24 hours. As a result, the residual antimony compounds in the solution were adsorbed into the precipitate and then filtration was carried out. The antimony concentration in the filtrate was 1.2 p.p.m.

The procedure of Example 6 was repeated except that copper chloride, zinc chloride or tin chloride instead of manganous chloride was used. In each case, the same result ws obtained.

EXAMPLE 7

To 100 g. of aqueous layer obtained in Example 1 was added 146 g. of sodium sulfide for 5 hours at 60°C., and the reaction was continued for 3 hours. The resultant was cooled up to a room temperature and filtered. As a result, the recovery of antimony was about 100 %, and the antimony concentration in the filtrate was 1 p.p.m.

EXAMPLE 8

To 100 g. of the filtrate (antimony concentration: 3,600 p.p.m., corresponding to 1 N of hydrochloric acid) obtained in Comparative Example 1 was added 2.9 g. of sodium sulfide at 60°C. and then the reaction was continued for 5 hours. The resultant was cooled up to a room temperature and filtered. The antimony concentration in the filtrate was 0.5 p.p.m.

EXAMPLE 9

To 100 g. of the filtrate (antimony concentration: 190 p.p.m.) in Comparative Example 2 was added 9.4 g. of a 35 % aqueous solution of hydrochloric acid to give a solution of 1 N hydrochloric acid. Thereto 0.75 g. of a 20 % aqueous solution of sodium sulfide was added. The reaction was continued at a normal temperature for 24 hours and the precipitate was filtered. As a result, the antimony concentration in the filtrate was 0.6 p.p.m. In case of using ammonium sulfide or hydrogen sulfide instead of sodium sulfide, the same result was obtained.

What we claim is:

1. A process for recovering antimony value out of spent antimony halide catalyst used in the fluorination of chloroalkanes, containing antimony trifluoride, antimony chlorfluoride, antimony trioxide, antimony pentoxide, a small amount of metal chloride, silicon dioxide and organic compounds which strongly adhere into spent antimony catalyst which comprises contacting said spent catalyst with water or mineral acid with agitation to separate organic compounds strongly adhered or included in said spent catalyst as an under layer from an aqueous upper layer into which antimony value is transferred, separating the resultant mixture into an aqueous upper layer and an organic under layer, treating said aqueous upper layer with at least one metal selected from the group consisting of iron, manganese, copper, zinc, tin and their chloride, sulfate or nitrate salts, neutralizing the treated aqueous layer with an alkali converting the antimony value to insoluble antimony compounds for co-precipitation with insoluble antimony compounds present wherein the pH of the layer is from about 7 to 10, adsorbing the residual antimony compounds into the co-precipitates and recovering the antimony compounds such that the antimony ion is present in the waste water in an amount less than 1 p.p.m.

2. The process of claim 1, wherein water or said aqueous layer is used in the ratio of about 0.4 to 2.5 parts by weight to 1 part by weight of spent antimony halide catalyst.

3. The process of claim 1, wherein said mineral acid is hydrochloric acid, sulfuric acid or nitric acid.

4. The process of claim 1, wherein the acidity of said aqueous layer including antimony value is below 12 N as a concentration of hydrochloric acid.

5. The process of claim 1, wherein said alkali is sodium hydroxide or potassium hydroxide.

6. A process for recovering antimony value out of spent antimony halide catalyst used in the fluorination of chloroalkanes containing antimony trifluoride, antimony chlorfluoride, antimony trioxide, antimony pentoxide, a small amount of metal chloride, silicon dioxide and organic compounds which strongly adhere into spent antimony catalyst which comprises contacting said spent catalyst with water or mineral acid with agitation to separate organic compounds strongly adhered or included in said spent catalyst as an under layer from an aqueous upper layer into which antimony value is transferred, separating the resultant mixture into an aqueous upper layer and an organic under layer, contacting said aqueous upper layer containing antimony value with at least one sulfide selected from the group consisting of hydrogen sulfide, sodium sulfide and ammonium sulfide under acidic conditions of about 0.001 to 4 N as hydrochloric acid and recovering the antimony compounds such that the antimony ion is present in the waste water in an amount of less than 1 p.p.m.

7. The process of claim 6, wherein said sulfide is used in the ratio of about 5 times by weight as a pure sulfide to the amount of antimony value in the aqueous layer.

8. The process of claim 6, wherein said contact of aqueous layer and sulfide is carried out at about 30° to 80°C.

* * * * *